United States Patent [19]

Challen

[11] 4,047,009
[45] Sept. 6, 1977

[54] DIGITAL TONE GENERATOR FOR USE WITH RADIO TRANSMITTERS AND THE LIKE

[75] Inventor: Richard F. Challen, Lynchburg, Va.

[73] Assignee: General Electric Company, Lynchburg, Va.

[21] Appl. No.: 677,973

[22] Filed: Apr. 19, 1976

[51] Int. Cl.$^2$ .................. G06F 15/34; H04B 1/16
[52] U.S. Cl. .................................... 235/152; 325/64; 328/14; 328/55
[58] Field of Search ............... 235/152, 197; 307/262; 325/64; 328/14, 55, 155; 340/170

[56] References Cited

U.S. PATENT DOCUMENTS

| | | | |
|---|---|---|---|
| 2,974,221 | 3/1961 | Peth | 325/64 |
| 3,529,250 | 9/1970 | Farrow et al. | 328/55 X |
| 3,657,657 | 4/1972 | Jefferson | 328/14 |
| 3,686,469 | 8/1972 | Clark et al. | 328/155 X |
| 3,833,854 | 9/1974 | Schonover | 328/55 X |
| 3,838,414 | 9/1974 | Wiles | 328/14 X |
| 3,962,645 | 6/1976 | Stewart | 325/64 X |

OTHER PUBLICATIONS

F. J. Lebert, "Walsh Function Generator for a Million Different Functions", Walsh Function Proceedings, Wash. D. C., 3-31-70.

Primary Examiner—Jerry Smith
Attorney, Agent, or Firm—James J. Williams

[57] ABSTRACT

Many radio continuous tone controlled squelch systems use a digitally generated tone. A digital adder is provided for the digital tone generator to introduce a phase shift to the tone to indicate that a radio transmission is ending.

6 Claims, 4 Drawing Figures

DIGITAL TONE GENERATOR FOR USE WITH RADIO TRANSMITTERS AND THE LIKE

BACKGROUND OF THE INVENTION

My invention relates to a digital tone generator for a radio transmitter, and particularly to a digital adder for changing the phase of the digitally generated tone.

In some frequency modulation radio communication systems, a tone of audio frequency (below that usually reproduced by a radio receiver) is transmitted to activate only a selected receiver or receivers, and thus provide privacy and prevent undesired messages from being reproduced by other receivers during the transmission. This arrangement is sometimes referred to as a continuous tone controlled squelch system (hereafter CTCSS) or a channel guard system. If the transmitted carrier is cut off when the transmission ends (by unkeying the microphone), then a burst or tail of noise will be heard at the activated receiver until the receiver noise squelch circuit takes over and mutes the receiver. In order that this tail of noise be blocked or eliminated, some frequency modulation communication systems use an arrangement that continues transmission of the carrier for a short period (such as 175 milliseconds) after the microphone is unkeyed. During this period while the carrier continues to be transmitted, the phase of the tone is shifted. Upon receipt of the tone with a phase shift, the activated receiver triggers a circuit to mute itself. During the time needed for the receiver to mute itself, the presence of the carrier prevents noise from being heard. Thereafter the receiver remains muted until a carrier with the proper tone is received again. Since digital circuits are being used increasingly because of their small size and versatility, digital tone generators are being used so that a tone of any desired frequency can be easily selected. Thus, there is a need for an arrangement to shift the phase of a digitally generated tone.

Accordingly, a primary object of my invention is to provide a new and improved arrangement for shifting the phase of a digitally generated tone transmitted by a radio transmitter.

Another object of my invention is to provide a digital adder that responds to keying of a radio transmitter and changes the phase of a digitally generated tone transmitted by the transmitter.

SUMMARY OF THE INVENTION

Briefly, these and other objects are achieved in accordance with my invention by a digital adder inserted between a digital counter and a digital tone function generator. The digital adder has a control input that responds to the operation or keying of a radio transmitter microphone. When the microphone is keyed, the digital counter signals are applied to the function generator in a first digital relation. When the microphone is unkeyed, the digital counter signals are applied to the function generator in a second digital relation to cause the function generator to shift its output a selected digital amount representing the desired angular phase shift. The function generator maintains the shifted condition and produces the digital outputs for producing the phase shifted tone as long as the microphone remains unkeyed. When the microphone is keyed again, the digital signals are applied to the function generator in the first digital relation again to provide the original condition.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF A PREFERRED EMBODIMENT

Figure 1:
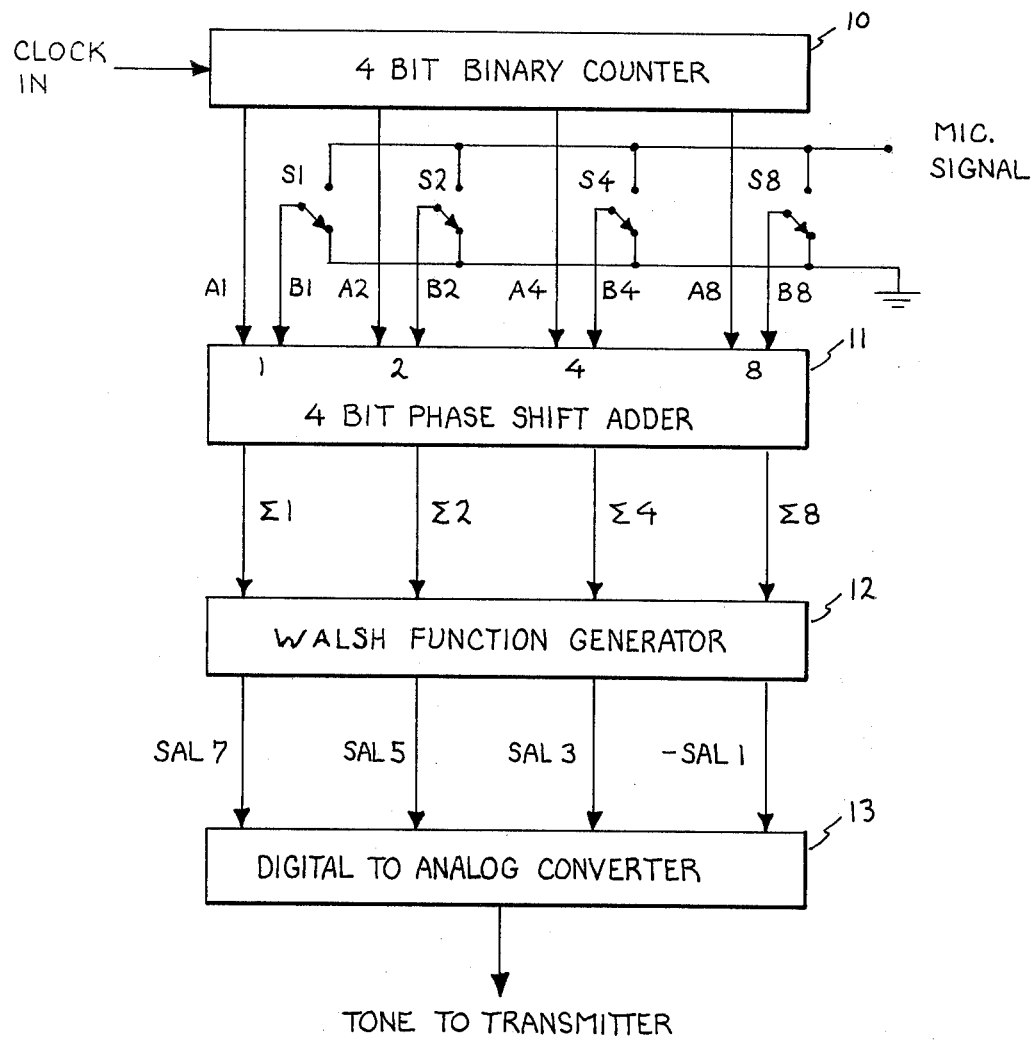
FIG. 1 shows a block diagram of a digital tone generator having a digital adder in accordance with my invention.

Two-way radio communication systems frequently use the continuous tone controlled squelch systems (CTCSS) to provide privacy, and to eliminate activating undesired receivers during a transmission. In CTCSS, one of 37 standard tones between 71.9 and 250.3 hertz is transmitted along with other information. This tone activates one or more receivers having filter equipment responsive to the selected tone. Thus, only those receivers having a filter responsive to the transmitted tone will be activited, so that privacy is increased and unnecessary transmissions are not heard by other receivers. Because of the relatively low tone frequencies (which are typically not reproduced by the receiver audio system), the filtering equipment responsive to those frequencies has a relatively long time constant. That is, once the filter produces an output responsive to the frequency, it continues to produce that output for a considerable time after the tone has actually stopped. This output keeps the receiver activated, so that even though the carrier transmission is stopped, the receiver remains unmuted. If the CTCSS operates in the frequency modulation bands, noise will be heard until the receiver noise squelch circuit takes over and mutes the receiver. This short time period of noise is sometimes referred to as a squelch tail. When a person must listen to transmissions for extended periods of time, these squelch tails can be bothersome. In order to eliminate the squelch tails, the CTCSS may include an arrangement at the transmitter which is responsive to the end of the transmission, such as by release of a microphone button, to maintain the carrier for a short period of time and continue transmitting the channel guard tone in a different phase relation. When a receiver receives the tone in a different phase relation, its filter circuit is arranged to immediately start squelching or muting the receiver. By the time the carrier is actually stopped, the receiver is muted, so that loss of the carrier will cause the receiver noise squelch circuit to operate and continue muting the receiver.

As mentioned previously there are presently 37 standard tone frequencies which are used in CTCSS. Since it may be desirable for a radio transmitter to transmit any one of those selected tones in order to activate any selected radio receiver in the CTCSS communication system, the tone generators have used digital techniques for producing the selected tone. These digital techniques permit a fixed frequency clock oscillator to have its output divided in such a manner that any of the desired tone frequencies can be produced. However, I have found that while such techniques are good in order to produce any one of the 37 selected tones, it does present a problem where a phase shift must be introduced in order to eliminate squelch tails or noise at the end of a transmission. Accordingly, I have provided a new and improved phase shift circuit for use in radio transmitters which have a tone generator using digital techniques.

In FIG. 1, clock pulses at an appropriate recurring rate (determined by the desired tone frequency) are serially applied to a typical and known 4 bit binary counter 10. This counter 10 takes the serial clock input pulses and divides or counts these pulses and produces them at four parallel outputs indicated A1, A2, A4, and A8, where A1 provides the least significant bits or pulses (which occur at the highest rate) and A8 provides the most significant bits or pulses (which occur at the lowest rate that is one eighth the A1 rate). These outputs have 16 different combinations which are repeated once for every 16 clock pulses. Previously these four parallel outputs would be applied to four parallel inputs of a function generator for producing a sine wave. Such a function generator could be a Walsh function generator 12 which is known in the art. One description of such a generator is given in a paper entitled "Walsh Function Generator for a Million Different Functions" by Fredrick J. Lebert, given at the Walsh Function Proceedings held at the Naval Research Laboratory in Washington, D.C. on Mar. 31, 1970. As known in the art, Walsh functions are described as Sal and Cal, and a typical generator such as the generator 12 produces the functions Sal 7, Sal 5, Sal 3, and Sal 1. These functions are applied to a digital to analog converter 13 which, as known, weights the functions, combines the weighted functions, and filters them to produce a sine wave whose frequency is determined by the clock pulse rate.

Figure 2:
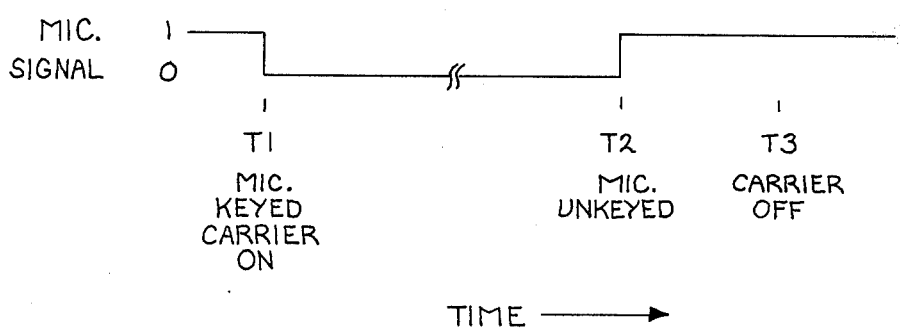
FIG. 2 shows a wave form representing the digital signals produced by a microphone when keyed and unkeyed.

In accordance with my invention, I provide a 4 bit phase shift adder 11 between the counter 10 and the generator 12 to introduce, in digital fashion, signals that provide the desired phase shift in order to eliminate squelch tails. The phase shift adder 11 is a known device that is sometimes referred to as a 4 bit binary full adder. The adder 11 adds, in binary fashion, the two bits A and B at each of its four dual inputs 1, 2, 4, and 8, and produces the binary sum at its four outputs $\Sigma 1$, $\Sigma 2$, $\Sigma 4$, and $\Sigma 8$. The bits A1, A2, A4, and A8 are derived from the counter 10. The bits B1, B2, B4, and B8 are derived from respective switches S1, S2, S4, and S8. The switches can be electronic or solid state switches as well as mechanical switches or wired connections. Each of these switches is represented as a single pole, double throw switch that can be connected to a lower contact that is grounded (which I assume is a logic 0) for no bit to be added, or that can be connected to an upper contact which receives the microphone signal. If the microphone is unkeyed or off, it produces (by any suitable means) a logic 1. If the microphone is keyed or on, it produces (by any suitable means) a logic 0. FIG. 2 shows the microphone signals. Initially, I have assumed that the microphone is unkeyed and a logic 1 is applied to the upper switch contacts. When, at the time T1, the microphone is keyed and the carrier is turned on, a logic 0 is applied to the upper switch contacts. When the microphone is unkeyed at the time T2, a logic 1 is applied to upper switch contacts. Then, at some later time T3 (usually about 175 milliseconds) the carrier is turned off. This 175 millisecond time during which the carrier is transmitted with the phase shifted tone is sufficient to enable the receiver to mute itself until the receiver noise squelch circuit responds to the loss of carrier and continues muting the receiver.

Figure 3:
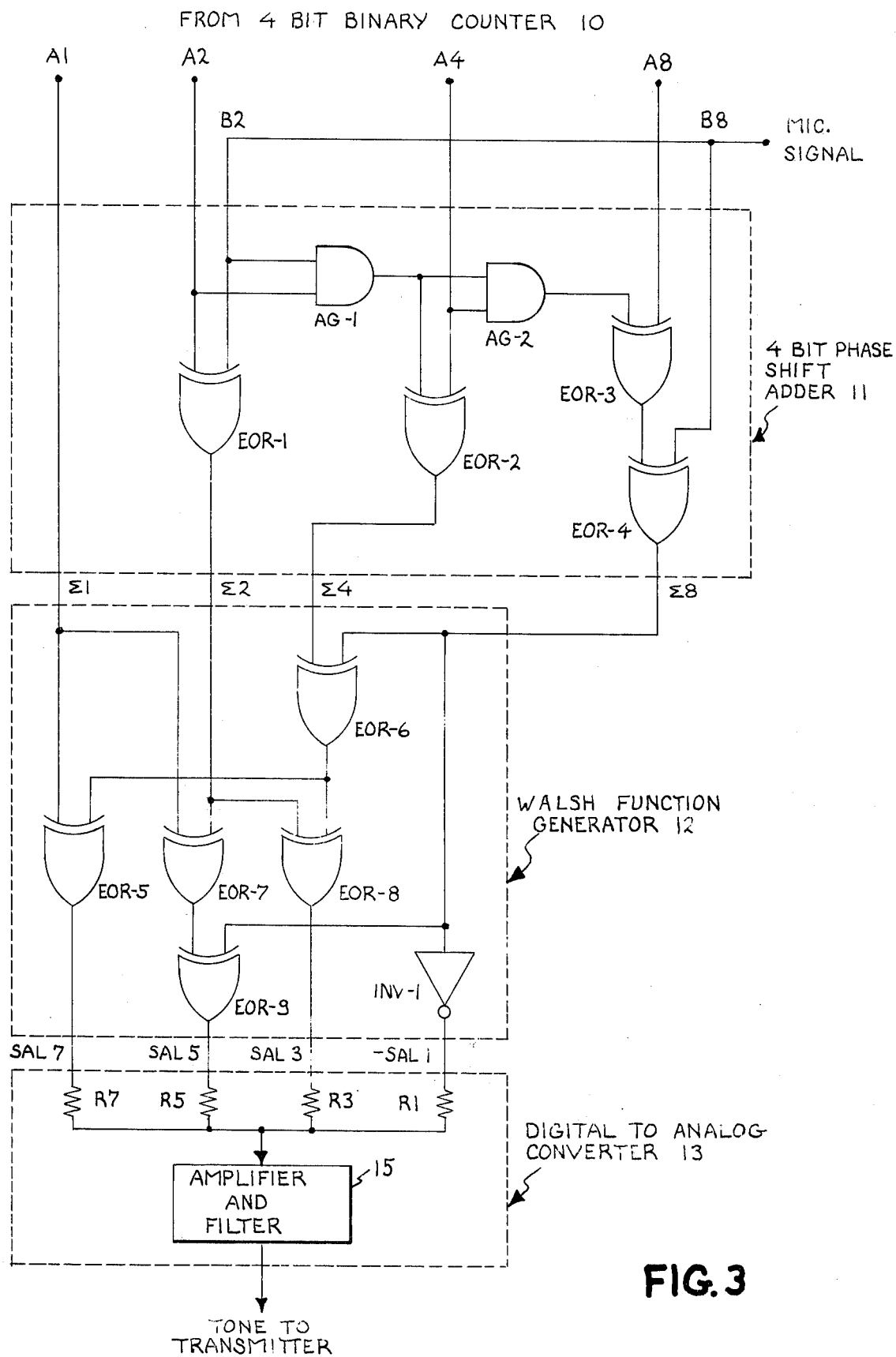
FIG. 3 shows a logic circuit diagram of a phase shift adder in accordance with my invention as used with a particular type of tone function generator.

One common phase shift used to indicate the end of a transmission is 135°. For the 16 different output combinations obtained from the counter 10, this phase shift can be obtained either by adding (135°/360°) × 16 or 6 units; or by adding [(360°−135°)/360°] × 16 or 10 units. Six units can be added by connecting switches S2 and S4 to the upper contacts. Ten units can be added by connecting switches S2 and S8 to the upper contacts. In either case, the effeect is to add 6 or 10 units (each representing 22.5° phase shift) when the microphone is keyed, and not to add a shift when the microphone is unkeyed. FIG. 3 shows one circuit diagram which can be used for my phase shift adder 11, for the Walsh function generator 12, and for the converter 13. In this adder 11, I have elected to add ten units (B2, B8) as it simplifies the circuits for carrying. And, I have assumed that the phase shift of 135° is not to be changed. Hence, the adder 11 of FIG. 3 has been simplified. The A1 output from the counter 10 is passed directly through the adder 11 to become the $\Sigma 1$ output of the adder 11. The A2 input is applied to one input of an EXCLUSIVE OR gate EOR 1. As known in the art, an EXCLUSIVE OR gate produces a logic 1 when one of its two inputs is a logic 1 and the other of its two inputs is a logic 0. An EXCLUSIVE OR gate produces a logic 0 when both of its both inputs are a logic 1 or a logic 0. The A2 input is also applied to one input of an AND gate AG 1 for carrying to the next more significant adder. As known in the art, and AND gate produces a logic 0 if either of its inputs is a logic 0, and produces a logic 1 only when both of its inputs are a logic 1. The output of the AND gate AG 1 is applied to one input of an EXCLUSIVE gate EOR 2 and to one input of another AND gate AG 2 for carrying. The A4 input is applied to the EXCLUSIVE OR gate EOR 2 and the AND gate AG 2. The output of the AND gate AG 2 is applied to an EXCLUSIVE OR gate EOR 3 along with the A8 input. And the output of the gate EOR 3 is applied to one input of an EXCLUSIVE OR gate EOR 4. The digital microphone signals are applied to the other inputs of the gates EOR 1, AG 1 for B2, and EOR 4 for B8. These microphone signals cause the pulses produced at the outputs $\Sigma 1$, $\Sigma 2$, $\Sigma 4$, and $\Sigma 8$ to be changed or shifted by an amount which, as explained above, results in a phase shift of 225° in the decoded wave.

The $\Sigma 1$, $\Sigma 2$, $\Sigma 4$, and $\Sigma 8$ outputs are applied to the function generator 12. Specifically, the output $\Sigma 1$ is applied to the inputs of two EXCLUSIVE OR gates EOR 5, EOR 7. The output $\Sigma 2$ is applied to the other input of the gate EOR 7 and one input of an EXCLUSIVE OR gate EOR 8. The output $\Sigma 4$ is applied to one input of an EXCLUSIVE OR gate EOR 6. The output $\Sigma 8$ is applied to the other input of the gate EOR 6, one input of an EXCLUSIVE OR gate EOR 9, and a logic inverter INV 1. The output of the gate EOR 6 is applied to the gates EOR 5, EOR 8. And the output of the gate EOR 7 is applied to the gate EOR 9.

The outputs of the Walsh function generator 12 are indicated as Sal 7, Sal 5, Sal 3, and an inverted output −Sal 1. These outputs are applied to respective weighted resistors R7, R5, R3, R1 in the converter 13. The weighted outputs from these four resistors are applied to an amplifier and filter 15 which produces a sine wave that is applied as tone to the transmitter. In one embodiment of my invention that was constructed, the resistors had the following values:

| R1 | 30,100 ohms |
| R3 | 71,500 ohms |
| R5 | 365,000 ohms |
| R7 | 150,000 ohms |

If the highest resistor, namely R5 of 365,000 ohms, is given an arbitrary weighted binary output of 1.0, then the weighted outputs

| R1 | 12.1 |
| R3 | 5.1 |
| R7 | 2.4 | the other are approximately:

| R1 | 12.1 |
| R3 | 5.1 |
| R7 | 2.4 |

With this arrangement, the following table represents the operation of my phase shift adder 11:

TABLE 1

| Sequence From Counter | MIC. Status | Walsh Function Generator | | | | Total Weighted Binary Output |
| --- | --- | --- | --- | --- | --- | --- |
| | | −SAL 1 (12.1) | SAL 3 (5.1) | SAL 5 (1.0) | SAL 7 (2.4) | |
| 1 | KEYED-0 | 0 | 1 | 1 | 1 | 8.5 |
| 2 | | 0 | 1 | 0 | 0 | 5.1 |
| 3 | | 0 | 0 | 0 | 1 | 2.4 |
| 4 | | 0 | 0 | 1 | 0 | 1.0 |
| 5 | | 0 | 0 | 1 | 0 | 1.0 |
| 6 | | 0 | 0 | 0 | 1 | 2.4 |
| 7 | | 0 | 1 | 0 | 0 | 5.1 |
| 8 | | 0 | 1 | 1 | 1 | 8.5 |
| 9 | | 1 | 0 | 0 | 0 | 12.1 |
| 10 | | 1 | 0 | 1 | 1 | 15.5 |
| 11 | | 1 | 1 | 1 | 0 | 18.2 |
| 12 | | 1 | 1 | 0 | 1 | 19.5 |
| 13 | | 1 | 1 | 0 | 1 | 19.5 |
| 14 | | 1 | 1 | 1 | 0 | 18.2 |
| 15 | | 1 | 0 | 1 | 1 | 15.5 |
| 16 | | 1 | 0 | 0 | 0 | 12.1 |
| 1 | UNKEYED-1 | 1 | 1 | 1 | 0 | 18.2 |
| 2 | | 1 | 1 | 0 | 1 | 19.5 |
| 3 | | 1 | 1 | 0 | 1 | 19.5 |
| 4 | | 1 | 1 | 1 | 0 | 18.2 |
| 5 | | 1 | 0 | 1 | 1 | 15.5 |
| 6 | | 1 | 0 | 0 | 0 | 12.1 |
| 7 | | 0 | 1 | 1 | 1 | 8.5 |
| 8 | | 0 | 1 | 0 | 0 | 5.1 |
| 9 | | 0 | 0 | 0 | 1 | 2.4 |
| 10 | | 0 | 0 | 1 | 0 | 1.0 |
| 11 | | 0 | 0 | 1 | 0 | 1.0 |
| 12 | | 0 | 0 | 0 | 1 | 2.4 |
| 13 | | 0 | 1 | 0 | 0 | 5.1 |
| 14 | | 0 | 1 | 1 | 1 | 8.5 |
| 15 | | 1 | 0 | 0 | 0 | 12.1 |
| 16 | | 1 | 0 | 1 | 1 | 15.5 |

Figure 4:
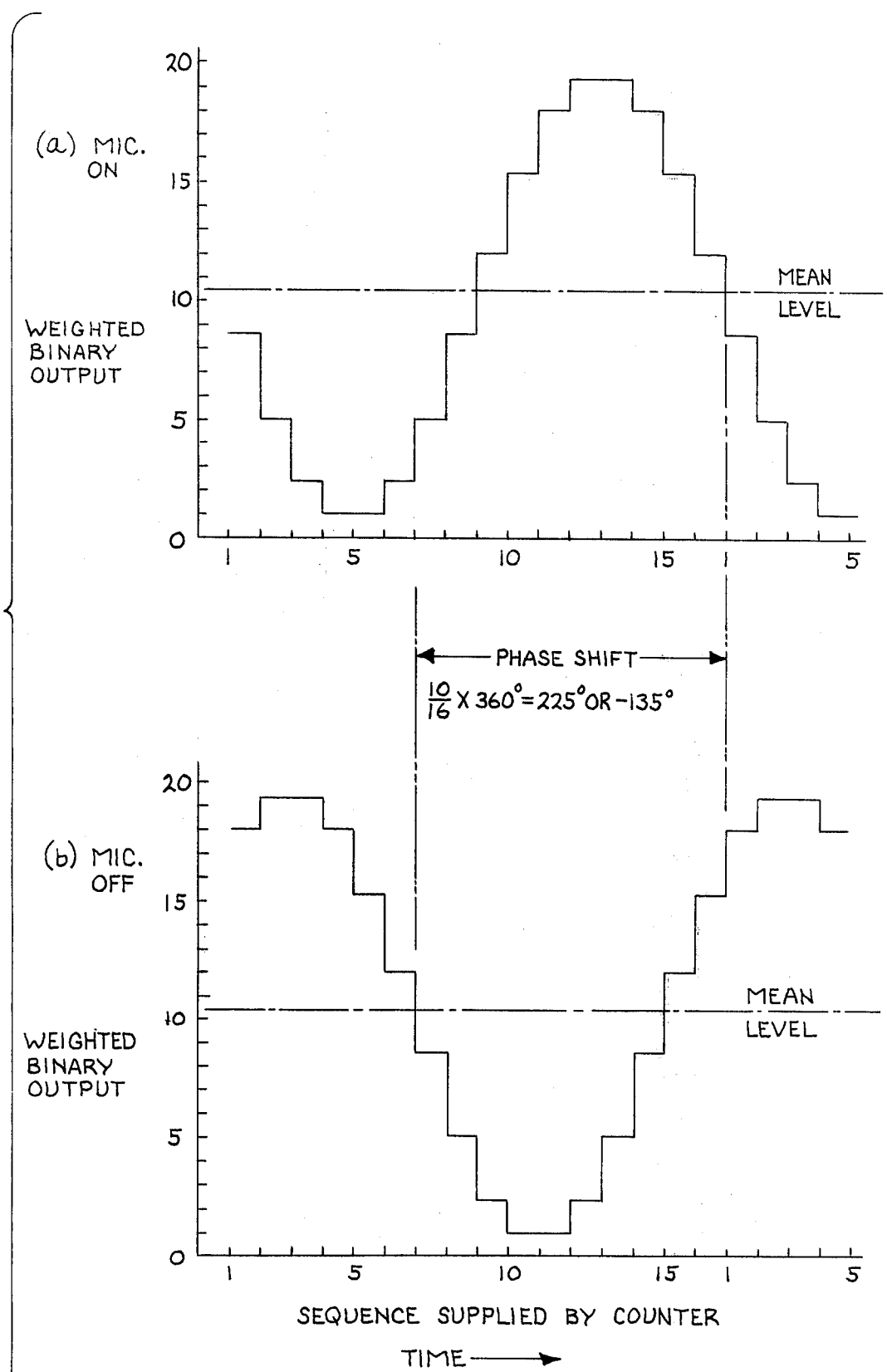
FIG. 4 shows wave forms representing the operation of my phase shift adder.

The first 16 lines of the table represent the bit numbers from the counter 10 when the microphone is keyed and produced a logic 0. The outputs of the Walsh function generator had the logic conditions shown, and these conditions had the total weighted binary output indicated in the last column. Similarly, the next 16 lines show the operation when the microphone was unkeyed and produced a logic 1 signal. In FIG. 4a, I have plotted a wave from illustrating the operation of the microphone being on or keyed, and in FIG. 4b I have plotted another wave form showing the output when the microphone is off or unkeyed. Both of these wave forms are plotted along a common time axis or with corresponding sequences from Table 1. The wave forms shown in FIG. 4 represent the Walsh function generator output, with the weighted conditions indicated in Table 1. These wave forms can be easily filtered to produce a relatively accurate sine wave. FIG. 4, as well as Table 1, shows the conditions of how a phase shift is introduced. For example, if the microphone is on or keyed when bit count 4 occurs, the weighted binary output is 1.0. If at this time the microphone is turned off or unkeyed, the weighted output shifts to a binary weighted output of 18.2. FIGS. 4a and 4b and Table 1 shows that a phase shift of ten units of 22.5° each is introduced between the keyed and unkeyed conditions for any counter sequence. The total effect is a phase shift of 225° or −135°. This shift is provided by my phase shift adder 11, which is compatible with digital signals for producing tones, and which serves to introduce a phase shift to those digital signals. The phase shift of 10 units is introduced since the digital microphone signal is applied to the input B2 and the input B8 for the adder 11. Other phase shifts are possible, depending upon the angular phase shift desired. For a known adder 11 of FIG. 1, if a 180° phase shift were desired, the digital microphone signal would be applied only to the input B8 which has a binary weight of eight units of 22.5° each. If a 90° phase shift were desired, then the digital microphone signal would be applied only to the input B4 which has a binary weight of four units of 22.5° each. Thus, for a 16 pulse sequence, angular variations of one pulse out of 16° or 22.5° can be obtained and, of course, the pulse rate may be any suitable value.

It will thus be seen that I have provided a new and improved arrangement having a phase shift adder connected between a binary output, such as a counter or shift register, and a function generator for producing tones from this binary output. While I have shown only one embodiment, persons skilled in the art will appreciate that modifications may be made. For example, other types of function generators can be utilized in place of the particular Walsh function generator shown in FIG. 3. The adder 11 may have switchable B inputs, or may be wired for a fixed number of added B inputs. And the logic (i.e. a logic 1 or a logic 0) may be reversed for the microphone signals, since the phase shift itself (and not the advanced or retarded phase shift) is the effect desired to indicate a transmission is ending. Other bit sequences and weights can be used. Therefore, it is to be understood that modifications may be made without departing from the spirit of the invention or from the scope of the claims.

What I claim as new and desire to secure by Letters Patent of the United States is:

1. For use in a radio communication system in which a tone of selected frequency is transmitted for activating at least one selected receiver and in which the phase of said tone is shifted to indicate the end of a transmission, an improved digital tone generator comprising:
   a. a counter having an input for a clock signal and a plurality of digital signal outputs;
   b. a function generator having a plurality of digital inputs and an output for generating a tone in response to digital signals applied to said digital inputs;
   c. and a digital adder connected between said counter outputs and said generator inputs for applying said counter digital signals to said function generator, said digital adder having means for adding selected digital signals to said function generator inputs in response to the end of a transmission, thereby changing the phase of said function generator output to indicate to said one selected receiver that the transmission is ended.

2. The improved tone generator of claim 1 wherein said digital adder adds selected digital signals to at least two of said function generator digital inputs.

3. The improved tone generator of claim 1 wherein said function generator is a Walsh function generator.

4. An improved tone generator circuit for use with a radio transmitter which transmits a tone of selected frequency during operation to activate a predetermined radio receiver, and which transmits said tone at a different phase for at least a predetermined time following the end of a transmission to eliminate noise in said radio receiver, said tone generator comprising:
   a. a source of recurring clock signals;
   b. counter means having an input connected to said source of clock signals and having a plurality of parallel outputs for producing pulses of predetermined repetition frequencies in response to said clock signals;
   c. a function generator having a plurality of parallel inputs and a single output for producing a substantially sinusoidal output signal in response to digital pulses applied to said function generator parallel inputs;
   d. and a digital adder circuit connecting said parallel outputs of said counter to said parallel inputs of said function generator for supplying pulses from said counter to said function generator, said digital adder having an input for connection to said transmitter and responsive to the operation thereof to cause selective pulses to be applied to said function generator inputs and thereby change the phase of said substantially sinusoidal output signal during said predetermined time.

5. The improved tone generator circuit of claim 4 wherein said digital adder circuit causes said function generator to shift the phase of said output signal by approximately 135°.

6. The improved tone generator circuit of claim 5 wherein said function generator is a Walsh function generator.

* * * * *

UNITED STATES PATENT OFFICE
CERTIFICATE OF CORRECTION

Patent No. 4,047,009      Dated September 6, 1977

Inventor(s) Richard F. Challen

It is certified that error appears in the above-identified patent and that said Letters Patent are hereby corrected as shown below:

Col. 4, line 17, cancel "effeect" and insert -- effect --

Col. 5, lines 17, 18 & 19, delete these lines; this same table is shown on lines 22, 23 & 24

Col. 6, line 13, cancel "shows" and insert -- show --

Col. 6, line 63, cancel "16°" and insert -- 16 --

Signed and Sealed this

Thirteenth Day of June 1978

[SEAL]

Attest:

RUTH C. MASON
*Attesting Officer*

DONALD W. BANNER
*Commissioner of Patents and Trademarks*